FANNY J. SHINN.
STEAM-COOKER.

No. 175,513. Patented March 28, 1876.

WITNESSES
Henry N. Miller
C. L. Evert

INVENTOR
Fanny J. Shinn
Alexander Mater
By Attorneys

UNITED STATES PATENT OFFICE.

FANNY J. SHINN, OF SHERIDAN, ILLINOIS.

IMPROVEMENT IN STEAM-COOKERS.

Specification forming part of Letters Patent No. 175,513, dated March 28, 1876; application filed January 21, 1876.

*To all whom it may concern:*

Be it known that I, FANNY J. SHINN, of Sheridan, in the county of La Salle and State of Illinois, have invented certain new and useful Improvements in Steam-Cookers; and do hereby declare that the following is a full, clear, and exact description thereof, reference being had to the accompanying drawings and to the letters of reference marked thereon, making a part of this specification.

The nature of my invention consists in a wire-cloth vessel provided with strengthening ribs and inclined feet or legs, to be used in combination with an ordinary steam-cooker, as will be hereinafter more fully set forth.

In order to enable others skilled in the art to which my invention appertains to make and use the same, I will now proceed to describe its construction and operation, referring to the annexed drawings, in which—

Figure 1:
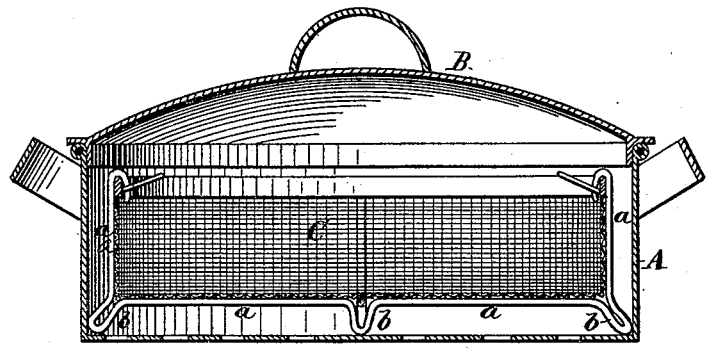
Figure 2:
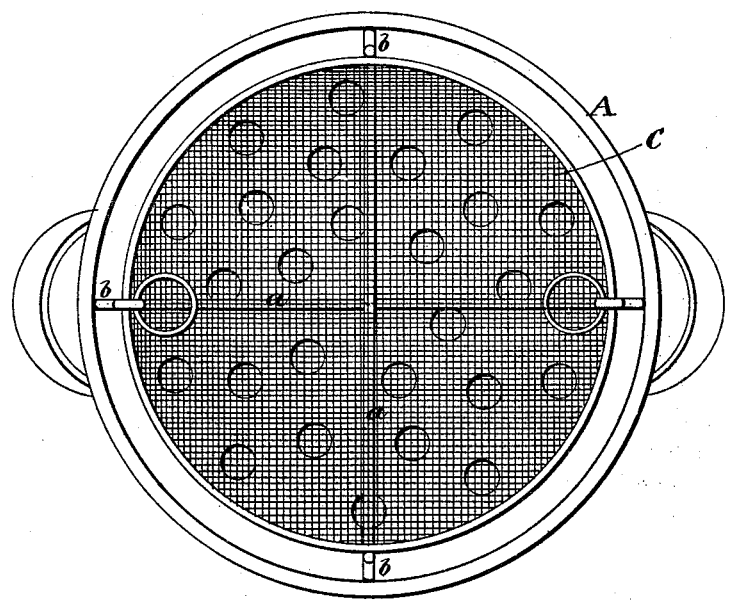

Figure 1 is a vertical section of a steam-cooker embodying my invention. Fig. 2 is a plan view of the same with the lid removed.

A represents an ordinary steam-cooker, having a series of holes or perforations in its bottom for the admission of steam, and provided with the lid or cover B. Within this steam-cooker is placed a vessel, C, made of wire-cloth or other similar material and provided across its bottom and sides with strengthening-ribs $a\ a$. These ribs may be made of wire or other suitable material and bent so as to form legs $b\ b$ to rest on the bottom of the cooker A. These legs or feet $b$ are bent outward, as shown in Fig. 1, so that while they hold the interior vessel C elevated from the bottom of the cooker A, they at the same time keep it from contact with the sides thereof.

The food to be steamed is placed in the interior vessel C, the lid B put on the cooker, and the cooker placed on top of the vessel containing the water. By having a space between the two vessels it prevents the condensed steam from being absorbed or taken up by the food. It also allows the steam to at once surround the material or food in the internal or screen steamer and thereby come in contact with all parts of the food, thus making more uniform and speedy the operation of cooking.

Having thus fully described my invention, what I claim as new, and desire to secure by Letters Patent, is—

The wire-cloth vessel C, provided with strengthening-ribs $a$ and inclined feet or legs $b$, in combination with an ordinary steam-cooker A, substantially as and for the purposes herein set forth.

In testimony that I claim the foregoing I have hereunto set my hand and seal this 25th day of December, 1875.

FANNY J. SHINN. [L. S.]

Witnesses:
 DELOS ROBINSON,
 AMOS ROBERTSON.